United States Patent
Hayhurst

(10) Patent No.: US 8,806,555 B2
(45) Date of Patent: Aug. 12, 2014

(54) DECENTRALIZED MEDIA DELIVERY NETWORK

(71) Applicant: William Hayhurst, Aurora, OR (US)

(72) Inventor: William Hayhurst, Aurora, OR (US)

( * ) Notice: Subject to any disclaimer, the term of this patent is extended or adjusted under 35 U.S.C. 154(b) by 0 days.

(21) Appl. No.: 13/867,819

(22) Filed: Apr. 22, 2013

(65) Prior Publication Data
US 2013/0247116 A1   Sep. 19, 2013

Related U.S. Application Data

(63) Continuation of application No. 10/491,511, filed as application No. PCT/US03/22214 on Jul. 16, 2003, now abandoned.

(60) Provisional application No. 60/396,357, filed on Jul. 17, 2007.

(51) Int. Cl.
| | |
|---|---|
| H04N 7/173 | (2011.01) |
| H04N 21/258 | (2011.01) |
| H04N 21/472 | (2011.01) |
| H04N 21/433 | (2011.01) |
| H04N 21/2543 | (2011.01) |
| H04N 21/4627 | (2011.01) |
| H04N 21/845 | (2011.01) |
| H04N 21/254 | (2011.01) |
| H04N 21/4402 | (2011.01) |
| H04N 21/63 | (2011.01) |
| H04N 21/6543 | (2011.01) |
| H04N 21/231 | (2011.01) |

(52) U.S. Cl.
CPC ... *H04N 21/25866* (2013.01); *H04N 21/47211* (2013.01); *H04N 21/4331* (2013.01); *H04N 21/2543* (2013.01); *H04N 21/4627* (2013.01); *H04N 21/8456* (2013.01); *H04N 21/2541* (2013.01); *H04N 21/4402* (2013.01); *H04N 21/47202* (2013.01); *H04N 21/632* (2013.01); *H04N 21/6543* (2013.01); *H04N 7/17318* (2013.01); *H04N 21/23106* (2013.01)
USPC ............................. 725/115; 725/93; 725/116

(58) Field of Classification Search
USPC .......................................... 725/93, 115, 116
See application file for complete search history.

(56) References Cited

U.S. PATENT DOCUMENTS

| | | | |
|---|---|---|---|
| 5,928,331 A * | 7/1999 | Bushmitch | 709/231 |
| 6,868,452 B1 * | 3/2005 | Eager et al. | 709/231 |
| 7,277,958 B2 | 10/2007 | Chung et al. | |
| 2002/0040479 A1 | 4/2002 | Ehrman et al. | |
| 2003/0097655 A1 * | 5/2003 | Novak | 725/31 |
| 2003/0204613 A1 | 10/2003 | Hudson et al. | |

* cited by examiner

*Primary Examiner* — Justin Shepard
*Assistant Examiner* — Charles N Hicks
(74) *Attorney, Agent, or Firm* — Hancock Hughey LLP

(57) ABSTRACT

A decentralized approach to delivering a media file to a requesting subscriber in a network of subscribers comprises the steps of segmenting the media file into a plurality of segments and distributing the segments of the media file among the network of subscribers, and responding to a request from the requesting subscriber by directing to that requesting subscriber al of the plurality of segments of the media file. All of the segments are assembled into the media file and displayed or stored by the requesting subscriber.

13 Claims, 2 Drawing Sheets

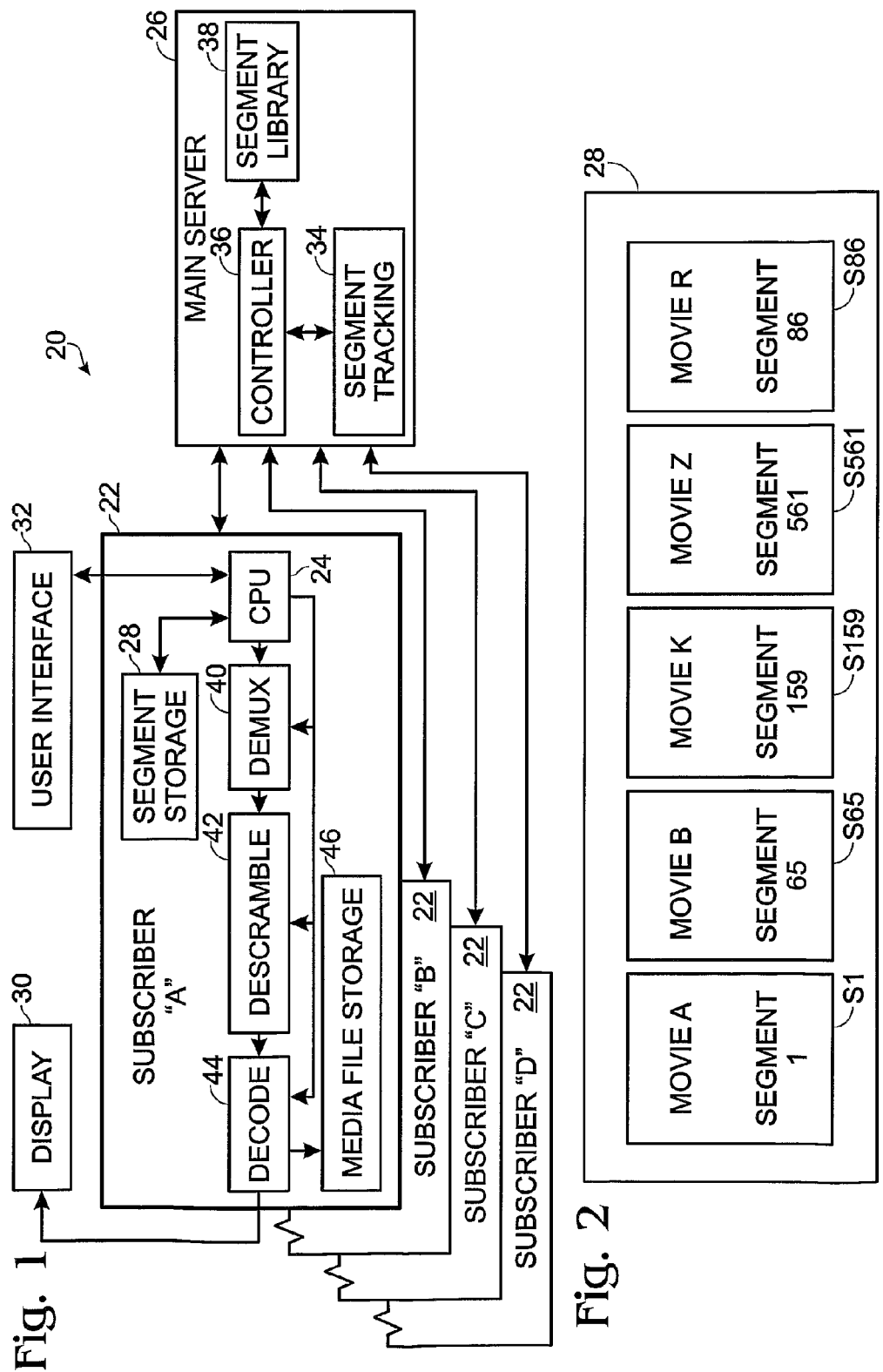

DECENTRALIZED MEDIA DELIVERY NETWORK

This is a continuation of U.S. patent application Ser. No. 10/491,511, filed Apr. 1, 2004, which claims the benefit of the filing date of U.S. Provisional Patent Application No. 60/396,357 filed Jul. 17, 2002, both of which applications are hereby incorporated by reference.

FIELD OF THE INVENTION

This application relates to the field of electronic media delivery, such as video-on-demand, including the secure handling and storage of such media.

BACKGROUND OF THE INVENTION

Current options for viewing a movie at home include traveling to a movie rental store to obtain a videotape or DVD copy of the movie. The copy must be returned a few days later. Another option is to select from the limited number of choices that are offered from sources that provide what is known as pay-per-view movies. Cable or broadcast movie channels provide a limited number of selections of movies for display at predetermined times.

It is usually not economically feasible for the operator of, for example, a cable television (CATV) system (or other content provider) to provide for delivery-on-demand a large number of movie selections to subscribers because such a system requires an extensive amount of bandwidth between the content provider and each of the subscriber units (televisions or other display devices) of the network.

The present invention addresses the problem of prohibitive bandwidth requirements for a content provider in delivering video-on-demand or other large media files. In short, there is provided a system that shifts the bandwidth requirements away from the content provider and to the network of subscriber units.

In one embodiment, a media file representing, for example, a movie is segmented. These segments are distributed among the network of subscriber units. Any one of the subscribers may submit a request to view a movie. In response to such a request, the other subscriber units direct to the requesting subscriber all of the segments, which are then assembled into the complete media file (movie) for display, or stored for later display, on the requesting subscriber's unit.

In one embodiment, the subscriber's request is sent to the network's main server. The main server then instructs the network subscribers to forward copies of the segments stored in those units to the unit of the requesting subscriber. The segments are each encrypted or otherwise encoded to prevent unauthorized viewing of individual segments. When the requesting subscriber has received all segments of the movie, that unit sends a message to the main server, requesting the encryption key to unlock the movie. The main server provides this, and billing information is then recorded in the main server.

The segmented and distributed storage of the media file provides a high level of security and a deterrence to piracy. No single subscriber unit has more than a segment of a media file, which segment, by itself, has little value.

In another embodiment, the segments of the media file are copied and these copied segments are also distributed to the network subscribers in a manner that provides redundancy to the system so that in the event that a given subscriber unit is unable to provide the requesting subscriber with the segment stored on that given unit, there will be available on other units copies of that segment to complete the media file.

It is contemplated that the request for the media file and subsequent responses for directing the segments to the requester can be handled without the intervention of the network's main server by using peer-to-peer architecture or the like.

Other advantages and features of the present invention will become clear upon study of the following portion of this specification and drawings.

BRIEF DESCRIPTION OF THE DRAWINGS

FIG. 1 is a block diagram of a system adapted for carrying out the decentralized media delivery of the present invention.

FIG. 2 is a depiction of how segments of a movie-type media file are stored on the units of network subscribers.

DETAILED DESCRIPTION OF PREFERRED EMBODIMENTS

Figure 3:
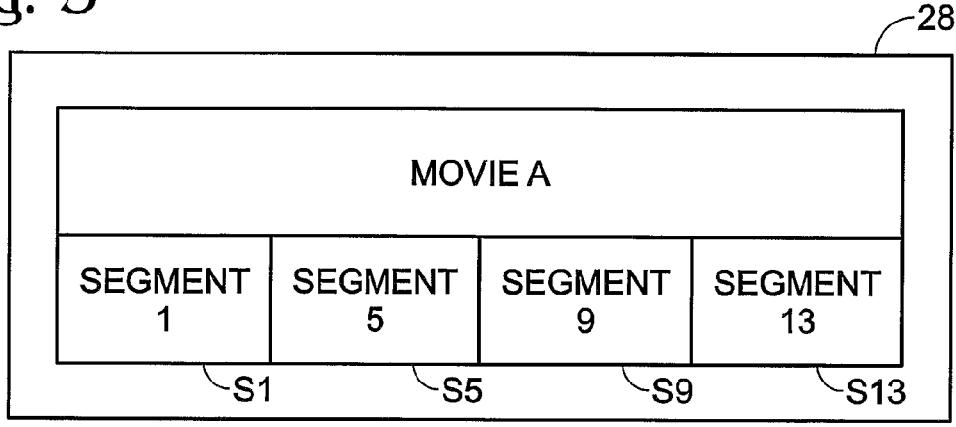
FIG. 3 is a depiction of an alternative way in which segments of a movie-type media file are stored on the units of network subscribers.

With reference to FIG. 1, a preferred embodiment of the present invention is includes a network 20 of electronically connected subscribers A, B, C, and D. The small number of subscribers depicted here is intended to be representative of, for example, the thousands of subscribers that may be part of a typical cable television (CATV) network. Alternatively, the network can be any other communications network of users or subscribers, such as those linked by a local area network (LAN) or a wide area network (WAN).

Each subscriber includes a unit 22, which, in a CATV network, can be adapted from a conventional set-top box. Each subscriber unit 22 includes a central processing unit (CPU) 24 that, among other things, is in communication with a main server 26 of the network for receiving and providing instructions and data as will be described.

Each subscriber unit 22 also includes a storage device, such as a conventional hard disk. This device, hereafter referred to as segment storage 28, stores segments of one or more media files. It is noteworthy here that the term "media file," although most often used hereafter to refer to digitized data that represents a movie and that can be processed to display the movie, is intended to also include any type of media file that can be stored and displayed.

Each subscriber unit 22 is associated with a display device 30, preferably capable of displaying video information, as well as a user interface 32 for receiving and processing information from the user of the subscriber unit. Such an interface 32 may be a convention television remote control for powering the unit and requesting a display of menu options (movie titles, etc.) for selection by the user. A speaker system (not shown) is also connected to the subscriber unit for providing audio information.

In accordance with the present invention, each unit 22 receives from the main server 26 one or more segments of a complete media file. The segments are stored in the corresponding segment storage 28. FIG. 2 depicts the segment storage 28 of one unit. Stored there are five different segments S1, S65, S159, S561, S86. Each segment is part of a different movie. In one embodiment, a segment is a digital packet that includes data representing a small portion of the movie (video and audio) as well as a header that includes a packet identifier, descrambling control, and other information. The header identifies the movie and the segment number of the movie so that the movie data may be readily assembled once all of the packets are collected, as will be described.

FIG. 3 depicts an alternative way of segmenting a media file (movie) for storage in the segment storage 28 of a subscriber unit. Here, several separate segments S1, S5, S9, and S13 of a movie ("Movie A") are bundled together for storage. The segments are separate in the sense that they represent discontinuous or non-sequential portions of the movie and must be sorted and integrated with the remaining segments (distributed elsewhere in the network) to provide the complete movie. This approach to segmenting the movie provides increased security from piracy since each subscriber A, B, C, etc., will store only very small portions of the movie on the storage device of the unit. If the segments are made very small, to the scale of a few bytes or single bits, decoding of any individual bundle will be virtually impossible. Further, access to the correct method for recombining the segments to re-create the original media file could be stored in a password-protected file, linked to an encryption key, or locked to all devices except the specific hardware device that created the bundled segments.

Although FIG. 3 shows only bundled segments of a single movie "A," it will be understood that each segment storage 28 of each subscriber unit 22 can store a number of such bundled segments from the same or different movies.

The main server 26 includes a controller 36 that controls the distribution of a multitude of segments over the network 20. The segments are delivered from a segment library 38 that comprises segments of all movies that are available to the network. In one embodiment, the main server 26 includes a segment-tracking module 34 for tracking the location of the segments. For example, in some networks not all of the subscriber units 22 may at all times participate in the media-file delivery system of the present invention. Accordingly, the segment-tracking module 34 stores the addresses of the participating units and, via a look-up-table or the like, keeps track of which segments are distributed to which units.

Whenever a subscriber requests a movie, the segment-tracking module 34 provides an efficient way of instructing the remaining units (that is, the ones storing the segments of the requested movie) to forward all of the stored segments to the requesting subscriber. The segment-tracking module 34 also permits, for example, occasional testing of the system wherein the controller 36 from time to time initiates a test movie request (wherein the main server acts as a requesting subscriber) and then compares the received segments with those listed in the segment-tracking module 34 to ensure that all segments are timely received. If not, that segment-tracking module 34, under the control of controller 36 can redistribute the missing segment (s) to other participating units 22.

In one embodiment each subscriber will receive and store at least one segment of a movie. Each segment, however, is copied and distributed to a plurality of different subscribers to provide for redundant availability of each segment in the event a subscriber's segment storage 28 becomes inaccessible. As noted, the main server's segment-tracking module 34 can track which segments are held by each subscriber unit, thereby to optimize the network's redundancy, and to facilitate replacement or redistribution of segments when necessary.

Figure 4:
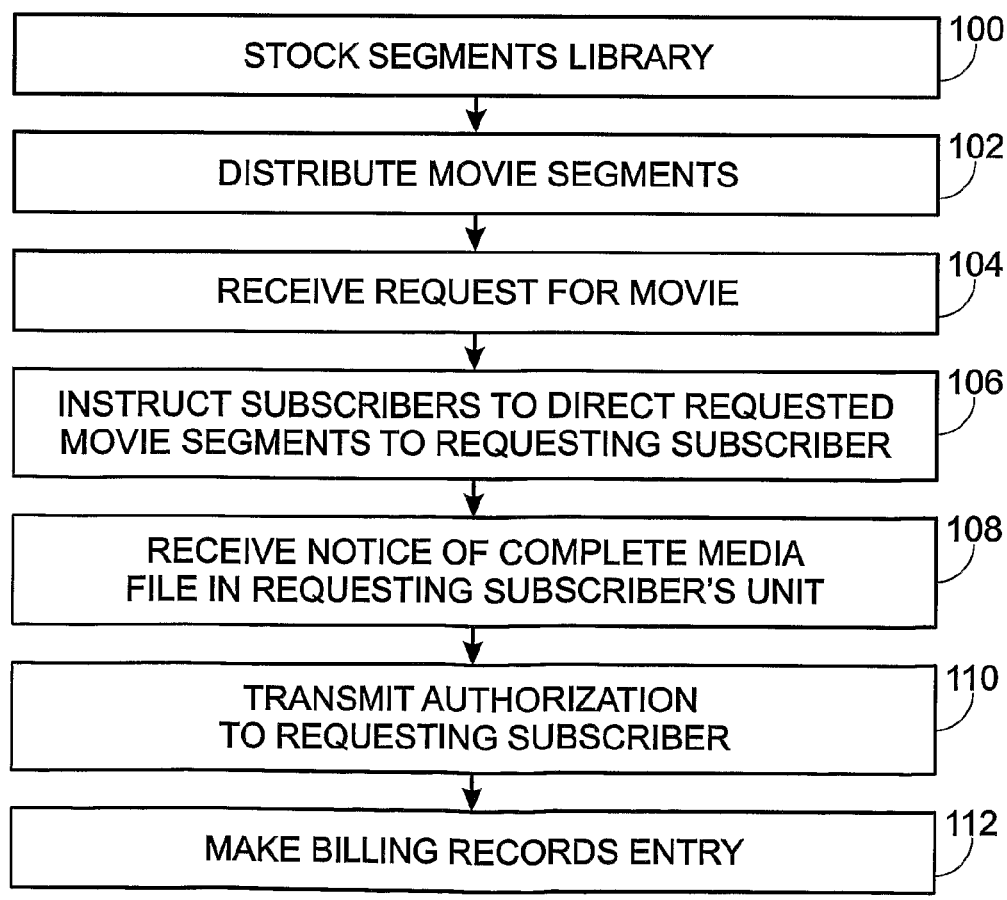
FIG. 4 is a flow diagram showing how the decentralized media file delivery of the present invention is carried out.

FIG. 4 shows a flow diagram indicating how the decentralized media file delivery of the present invention is carried out. Associated with the main server 26 is the segments library 38 that is stocked 100 with segments of available movies.

As noted, the main server 26, via the controller 36 and segment-tracking module 34, distribute 102 the movie segments (including copies of segments to establish the redundancy described above) to all of the participating subscriber units 22. Such distribution and storage of the segments on the units may be performed in a manner that is automatic and transparent to the users of the units.

With continued reference to FIG. 4, after the main server receives a movie request 104 from a requesting subscriber (the request made via user interface 32 described above), the server responds 106 by sending over the network instructions to the network subscriber units to direct all of the segments of the requested movie to the requesting subscriber.

The segments received at the requesting unit, comprising a stream of packets as mentioned above, are applied to a demultiplexer 40 (FIG. 1) for header parsing to recover the packet or segment identifier number, descrambling control, and other information. The subscriber unit CPU 24 and associated buffers (not shown) log the received packets and, once all packets are received, sends a notice to the main server 26 that all packets now reside in the unit of the requesting subscriber. The main server 26 upon receiving this notice 108 (FIG. 4) responds by transmitting authorization, such as an entitlement control message, to the subscriber unit 110. At that time, an entry is made in the requesting subscriber's billing information to reflect the purchase of the movie.

Once the authorization is received by the unit, the packets are then descrambled 42 (FIG. 1) and further processed by a decoder 44 to strip of header data and extract video and audio data for instant display on the subscriber's display device 30, or for storage as a complete media file (movie) in a mass storage device 46 associated with the requesting subscriber unit.

It is noteworthy here that the role of the main server 26 in receiving the movie request and instructing the subscribers to forward the segments to the requesting subscriber unit can be handled by other means, such as by use of a peer-to-peer approach whereby the request is provided directly to all of the network subscribers rather than being relayed from the main server 26. The subscriber units that have the requested segments stored therein respond by automatically forwarding those segments to the requesting subscriber. As is the case with the prior described embodiment (main server receives request and instructs subscribers) the sending and collection of segments occurs automatically, without intervention by any subscriber (apart from the initial request via the user interface 32 and mentioned above).

While the present invention has been described in terms of preferred embodiments, it will be appreciated by one of ordinary skill in the art that modifications may be made without departing from the teachings and spirit of the foregoing.

The invention claimed is:

1. A subscriber network for delivering a displayable, sequential media file that has a complete duration and that is requested by a requesting subscriber of a network of subscribers, comprising:

a library storing the sequential media file as a plurality of segments, each segment having a duration less than the complete duration and comprising a discrete sequence of the sequential media file such that the assembly of all of the plurality of segments in sequential order is required for displaying the sequential media file;

a distribution network connecting the library and the network of subscribers for distributing the plurality of segments of the media file among the network of subscribers for storage on respective units of the subscribers; and a server in communication with the network of subscribers and having a controller for responding to a request from a requesting subscriber by directing to that requesting subscriber all of the plurality of segments of the sequential media file; and a requesting subscriber unit configured for sequentially assembling into the complete duration of the sequential media file all of the segments that are directed to the requesting subscriber and wherein the segments of the sequential media file are encrypted in a manner that prevents display of the complete duration of the sequential media file until all of the segments are sequentially assembled into the sequential media file.

2. The network of claim 1 wherein the sequential media file is a complete movie having a chronological length and wherein each segment is a discrete sequence that represents a chronologically ordered portion of the movie that is less than the chronological length.

3. The network of claim 1 wherein the requesting subscriber unit is configured for storing the sequential media file in a storage device of the requesting subscriber for subsequent display on demand by the requesting subscriber.

4. The network of claim 1 wherein the library includes copies of some of the plurality of segments of the sequential media file for distributing the copied segments among the network of subscribers in a manner such that each of the copied segments of the sequential media file and the copy is stored on at least two different subscriber units.

5. The network of claim 1 wherein the server includes a module for tracking the location of the distributed segments in the subscriber network.

6. The network of claim 1 wherein the library also stores as segments a plurality of bundles of several discontinuous portions of the sequential media file.

7. A method of delivering a displayable, sequential media file that has a complete duration and that is requested by a requesting subscriber of a network of subscribers, comprising the steps of:

segmenting the complete media file into a plurality of segments, each segment having a duration less than the complete duration and comprising a discrete sequence of the media file such that the assembly of all of the plurality of segments in sequential order is required for displaying the complete media file;

encrypting the segments in a manner that prevents display of the complete duration of the sequential media file until all of the segments are sequentially assembled into the sequential media file;

distributing the segments of the media file among the network of subscribers for storage on respective units of the subscribers; and responding to a request from the requesting subscriber by directing to that requesting subscriber all of the plurality of segments of the media file; and sequentially assembling into the complete media file all of the segments that are directed to the requesting subscriber.

8. The method of claim 7 wherein the media file is a complete movie having a chronological length and wherein the segmenting step includes segmenting the movie in a manner such that the discrete sequences each represent a chronologically ordered portion of the movie that is less than the length.

9. The method of claim 7 including the step of storing the complete media file in a storage device of the requesting subscriber.

10. The method of claim 7 including the step of copying the segments of the media file and wherein the distributing step includes distributing the copied segments among the network of subscribers in a manner such that any particular segment of the media file is stored on at least two different subscriber units.

11. The method of claim 7 including the step of allowing display of only the assembled media file by providing authorization to the requesting subscriber.

12. The method of claim 7 including the steps of:
directing the request to a controller; and
relaying the request from the controller to the network of subscribers, whereby the controller thereafter instructs the network of subscribers to direct to the requesting subscriber all of the plurality of segments of the media file.

13. The method of claim 7 including the steps of:
directing the request to the network of subscribers, whereby in response to the request the network of subscribers directs to the requesting subscriber all of the plurality of segments of the media file.

* * * * *